March 23, 1937.    F. DORCEY    2,074,376

METHOD OF DECORATING EGGS

Filed April 29, 1935

INVENTOR.
F. Dorcey
BY
Morsell, Lieber & Morsell
ATTORNEY.

Patented Mar. 23, 1937

2,074,376

UNITED STATES PATENT OFFICE 2,074,376

METHOD OF DECORATING EGGS

Frances Dorcey, Milwaukee, Wis.

Application April 29, 1935, Serial No. 18,912

4 Claims. (Cl. 41—26)

The present invention relates to improvements in the art of decorating eggs, and relates more specifically to an improved method of artistically coloring or decorating the shells of hard boiled poultry eggs, and to improved means for exploiting the new method.

Generally defined, an object of the present invention is to provide a simple method of and means for effectively decorating eggs, especially for Easter display.

It has long been customary to decorate hard boiled poultry eggs during the Easter season, by applying various forms of coloring or decorating materials to the egg shells. The most common method at present in vogue, is to boil the eggs and to subsequently immerse the same in baths of liquid color which often contain obnoxious and even poisonous constituents. The egg shells frequently crack during the boiling operation, and when this occurs, the coloring liquid subsequently applied, seeps through the cracks and discolors the interior of the egg, making the same unpalatable and unfit for human consumption. Another common mode of coloring so-called Easter eggs, is by utilizing decalcomania transfers, whereby pictorial representations and figures may be reproduced upon the egg shells. This latter method is not only tedious and relatively expensive, but also requires a degree of skill which is not possessed by young children who are primarily interested in coloring or decorating eggs. The prior methods of producing colored or decorated Easter eggs are therefore highly objectionable both from the standpoint of health and application.

The present invention therefore contemplates provision of a new and useful process whereby poultry egg shells can be quickly and safely colored or decorated at extremely moderate cost by children too young to be permitted to practice the prior methods.

In accordance with the improved method, the eggs are decorated by applying ordinary colored wax crayon material, in the form of shavings or small particles, to the shells while the eggs are in heated condition, thereby producing a brilliant multi-colored layer of colored wax which penetrates the pores of the egg shell and clings thereto. While the wax colors effectively adhere to the egg shell, they will not penetrate or stick to the boiled interior of the egg, and in no manner detrimentally affect the palatability thereof. The coloring material may be applied either by merely rolling the warm egg in a layer of the wax particles confined in the palm of the hands, to produce a mottled multi-colored effect; or it may be applied to produce various regular pictorial designs, by transferring the wax coloring from a sheet of supporting material such as waxed paper. The improved method is thoroughly safe and sanitary and has considerable educational value since it can be be exploited in schools, and the final wax coated eggs can also be used as wax crayons capable of producing attractive multi-colored lines.

These and other specific objects and advantages will be apparent from the following detailed description.

A clear conception of the several steps involved in the improved method, and of several modes of carrying on or applying the new process of decorating eggs, may be had by referring to the drawing accompanying and forming a part of this specification in which like reference characters designate the same or similar parts in the various views.

While the improved decorating method may have greatest utility in connection with the coloring of poultry eggs for Easter display, it is not intended to unnecessarily restrict the scope by the present disclosure which is more or less confined to such use of the method, since some of the improved features may obviously be capable of more extensive utilization.

As previously indicated, the improved method consists primarily in applying a layer of mixed multi-colored shavings or chips of wax to the porous outer surface of the shell of an egg while the latter is in heated condition, or while the wax particles are being subjected to external heat sufficient to cause momentary melting thereof. When the colored wax particles are thus brought in contact with the egg shell, and are melted by the heat, the wax quickly spreads and flows into the pores of the shell, thereby causing effective blending of the adjacent particles into each other and producing a continuous mottled multi-colored layer of wax which is thoroughly attached to the egg. As the heat is disbursed and the wax coating sets, a shiny outer surface is produced, which hermetically seals the egg and thereby tends to preserve the same. The egg shell may, however, be subsequently broken, and due to the waxy nature of the coating material, this material will not cling to the interior hard boiled portion of the egg, and will thereby permit the egg to be eaten without destroying its palatability.

Figure 1:
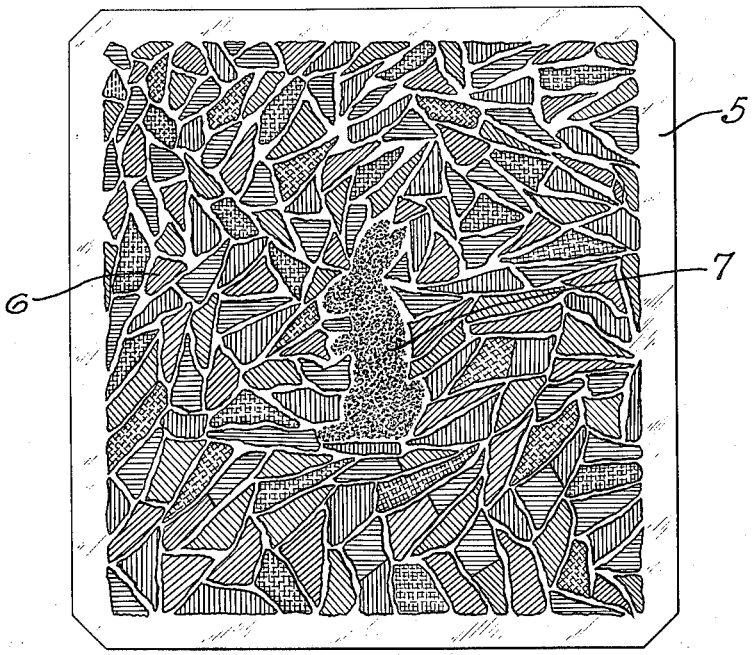
Fig. 1 is a plan view of a blank or sheet of material having a layer of colored wax particles applied thereto preparatory to transfer thereof to an egg.
Figure 2:
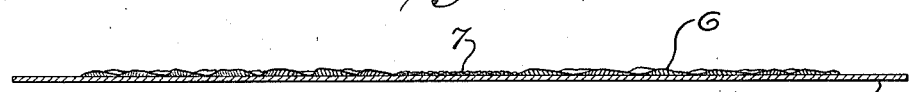
Fig. 2 is a somewhat distorted sectional perspective view of a fragment of the color supporting blank.
Figure 3:
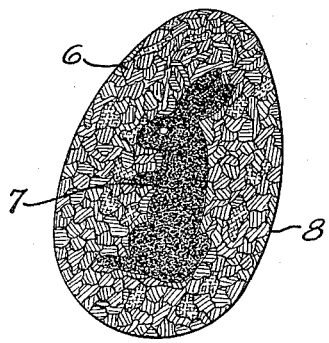
Fig. 3 is a representation of an egg which has been decorated with a color blank similar to that illustrated in Fig. 1.

While the decorative wax may be applied in various ways, as by chipping or shaving particles of ordinary colored wax crayons and subsequently applying a layer of the shavings with the palms of the hands to the boiled egg before it has finally cooled after the boiling operation, the method may be carried on perhaps more economically and effectively by utilizing previously prepared blanks such as shown in the drawing. The blanks 5 may be formed of any suitable and inexpensive flexible sheet material such as fabric, wax paper, glassine paper, or "cellophane", to the surface of which the colored wax shavings or particles 6 may be attached in any suitable manner. While adhesive material may be utilized in order to cause the colored wax particles 6 to cling to the blank 5, it has been found that slight application of heat during the deposition of the particles 6 upon the blank 5, will produce the required adherence, especially if the blank is formed of wax coated material. The blank 5 may thus be provided with a definite pictorial representation such as the rabbit 7, and when the blank 5 is applied to an egg 8 in the presence of heat, the result will be as illustrated in Fig. 3.

From the foregoing description, it must be apparent that the present invention provides a simple, safe and highly effective method of decorating egg shells or the like, which can be practiced by young children and which will preserve the treated eggs and retain their palatability to the utmost degree. By regulating the thickness of the layer of coating material, any desired thickness of final layer may be obtained, and the coated eggs may be utilized as actual crayons for producing multi-colored line effects. The improved method has considerable educational value since the theory involved of opening the egg shell pores by heat, of melting the wax, and of producing final adhesion by causing the fluent wax to enter the open egg shell pores, can be readily explained to and absorbed by the children, and the method has proven highly successful in actual use in the production of mottled brilliantly colored and attractive Easter eggs.

It is also noteworthy, that while the colored wax particles will effectively cling to the egg shell, when heated, they do not stick to the human hand after they solidify upon cooling. While the application of the wax shavings or particles to a blank as shown in the drawing, possesses certain advantages, the particles may be distributed in batches confined within a bag or other container, or may even be produced by shaving ordinary wax crayons in a pencil sharpener or with a knife of any kind. The colored wax particles may also be deposited in a bath of warm water, and will soften and float upon the liquid due to the difference in specific gravity of the wax and the water. By subsequently passing an egg through the floating layer of wax, the latter will be caused to adhere to the egg shell, to produce beautiful color effects.

It should be understood that it is not desired to limit the invention to the exact details of procedure herein described and illustrated, for various modifications within the scope of the appended claims may occur to persons skilled in the art.

It is claimed and desired to secure by Letters Patent:

1. The method of decorating eggs, which comprises, applying a layer of differently colored wax chips to the egg shell in the presence of sufficient heat to cause the chips to adhere to the shell and to provide a mottled continuous coating of substantial thickness.

2. The method of decorating eggs, which comprises, boiling the egg, and applying a layer of differently colored wax chips to the egg shell while the egg still has enough residual internal heat to melt the chips sufficiently to cause the chips to adhere to the shell and to provide a mottled continuous coating of substantial thickness.

3. The method of decorating eggs, which comprises, applying a layer of differently colored chips of fusible crayon to the egg shell in the presence of sufficient heat to cause the chips to adhere to the shell and to provide a mottled coating of substantial thickness.

4. The method of decorating eggs, which comprises, heating the egg, and applying a layer of differently colored chips of fusible crayon to the egg shell while the egg still has enough residual internal heat to melt the chips sufficiently to cause the chips to adhere to the shell and to provide a mottled coating of substantial thickness.

FRANCES DORCEY.